(12) United States Patent
Kim

(10) Patent No.: US 11,599,268 B2
(45) Date of Patent: Mar. 7, 2023

(54) STORAGE DEVICE AND METHOD OF OPERATING THE SAME

(71) Applicant: SK hynix Inc., Gyeonggi-do (KR)

(72) Inventor: Bo Kyeong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 12 days.

(21) Appl. No.: 17/221,286

(22) Filed: Apr. 2, 2021

(65) Prior Publication Data

US 2022/0107734 A1    Apr. 7, 2022

(30) Foreign Application Priority Data

Oct. 7, 2020   (KR) ......................... 10-2020-0129545

(51) Int. Cl.
    *G06F 3/06*     (2006.01)
    *G06F 11/10*    (2006.01)

(52) U.S. Cl.
    CPC .......... *G06F 3/0611* (2013.01); *G06F 3/0619* (2013.01); *G06F 3/0656* (2013.01); *G06F 11/1068* (2013.01)

(58) Field of Classification Search
    None
    See application file for complete search history.

(56) References Cited

U.S. PATENT DOCUMENTS

| 9,910,786 | B2 | 3/2018 | Freyensee et al. |
| 11,126,378 | B1* | 9/2021 | Parker ................. G06F 11/1048 |
| 2015/0254134 | A1* | 9/2015 | Suzuki .................... G06F 3/064 714/760 |
| 2020/0151055 | A1* | 5/2020 | Eom ..................... G06F 3/0619 |
| 2021/0373802 | A1* | 12/2021 | Helmick ............... G06F 3/0644 |
| 2021/0373804 | A1* | 12/2021 | Gorobets ................ G06F 3/068 |

FOREIGN PATENT DOCUMENTS

KR    10-2020-0054402    5/2020

* cited by examiner

*Primary Examiner* — Stephanie Wu
(74) *Attorney, Agent, or Firm* — IP & T Group LLP

(57) ABSTRACT

The present technology relates to an electronic device. According to the present technology, a storage device having an improved operation speed includes a memory device including a plurality of memory areas, a buffer memory configured to store first parity information including a parity for data stored in each of one or more first memory areas among the plurality of memory areas, and a memory controller configured to store second parity information including a parity for data stored in each of one or more second memory areas except for the one or more first memory areas among the plurality of memory areas and control the memory device to store, when a sudden power off occurs, dump parity information including some of the first parity information and the second parity information.

15 Claims, 19 Drawing Sheets

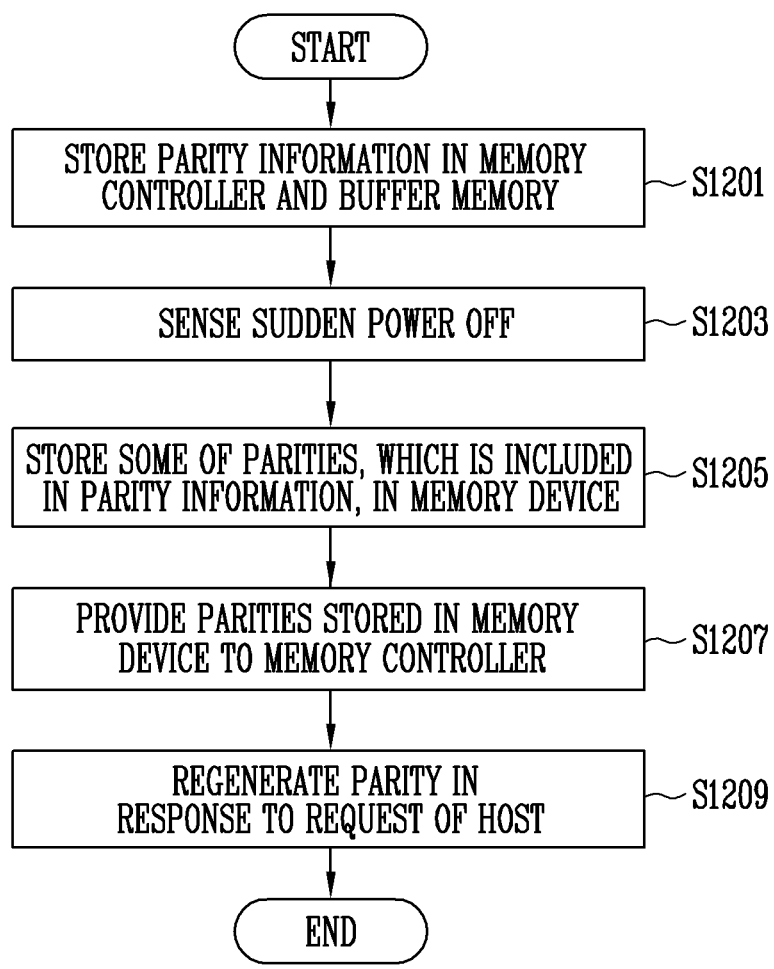

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0129545, filed on Oct. 7, 2020, which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having an improved operation speed and a method of operating the same.

According to an embodiment of the present disclosure, a storage device may include a memory device including a plurality of memory areas, a buffer memory configured to store first parity information including a parity for data stored in each of one or more first memory areas among the plurality of memory areas, and a memory controller configured to store second parity information including a parity for data stored in each of one or more second memory areas except for the one or more first memory areas among the plurality of memory areas and control the memory device to store, when a sudden power off occurs, dump parity information including some of the first parity information and the second parity information.

According to an embodiment of the present disclosure, a memory controller that controls a buffer memory and a memory device including a plurality of memory areas may include a parity information controller configured to provide first parity information including a parity for data stored in each of one or more first memory areas among the plurality of memory areas to the buffer memory, and store second parity information including a parity for data stored in each of one or more second memory areas except for the one or more first memory areas among the plurality of memory areas, and a sudden power off controller configured to control the memory device to store dump parity information including some of the first parity information and the second parity information when a sudden power off occurs.

According to an embodiment of the present disclosure, a method of operating a storage device may include storing parity information including a parity for data, which is stored in a plurality of memory areas, in a buffer memory and a memory controller, sensing a sudden power off, storing some of the parities included in the parity information in a memory device in response to the sudden power off, providing the some of the parities to the memory controller in response to power-on after the sudden power off, and regenerating a parity for data corresponding to a request input from a host according to whether the parity for the data corresponding to the request input from the host is included in the some of the parities provided to the memory controller.

According to an embodiment of the present disclosure, an operating method of a controller may include storing data into a memory device while generating a parity for the data, buffering the parity as a first parity into a first memory while moving, when the first memory becomes full of the first parities, at least a part of the first parities as second parities to a second memory or as third parities to the memory device, dumping, once a sudden power off (SPO) occurs, the first parities and then the second parities into the memory device until a remaining power of the system is exhausted, loading, during a recovery after the SPO, the dumped parities respectively back to the first and second memories and generating, when a parity for a requested data is not in any of the first memory, the second memory and the memory device, the parity for the requested data.

According to the present technology, a storage device having an improved operation speed and a method of operating the same are provided.

BRIEF DESCRIPTION OF THE DRAWINGS

FIG. 12 is a diagram illustrating a method of operating a storage device according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and the descriptions are not limited to the embodiments described in the present specification or application.

Figure 1:
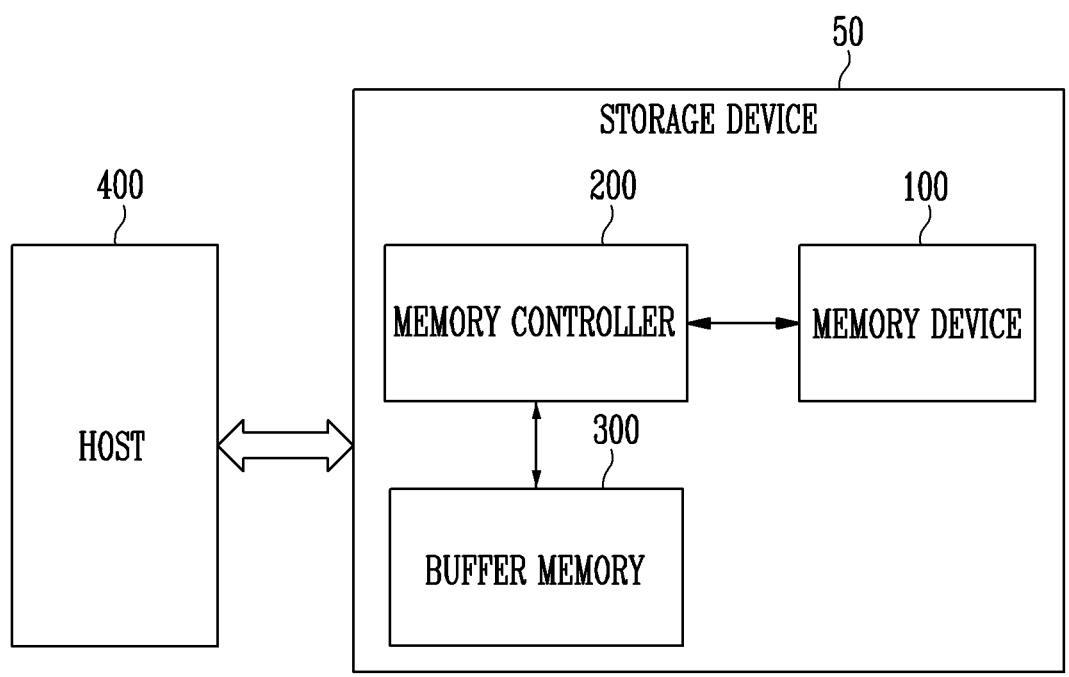
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100, a buffer memory 300, and a memory controller 200 that controls an operation of the memory device 100 and the buffer memory 300. The storage device 50 may be a device that stores data under control of a host 400 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 400. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command CMD and an address ADDR from the memory controller 200 and access an area selected by the address in the memory cell array. The memory device 100 may perform an operation instructed by the command CMD on the area selected by the address ADDR. For example, the memory device 100 may perform a write operation (program operation), a read operation, and an erase operation. During the program operation, the memory device 100 may program data in the area selected by the address ADDR. During the read operation, the memory device 100 may read data from the area selected by the address ADDR. During the erase operation, the memory device 100 may erase data stored in the area selected by the address ADDR.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 400, and the memory controller 200 may include a flash translation layer (FTL) that controls communication between the host 400 and the memory device 100, and a flash interface layer (FIL) that controls communication with the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored. In the present specification, the LBA and a "logic address" or a "logical address" may be used as having the same meaning. In the present specification, the PBA and a "physical address" may be used as having the same meaning.

The memory controller 200 may control the memory device 100 to perform the program operation, the read operation, or the erase operation according to a request of the host 400. During the program operation, the memory controller 200 may provide a write command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently regardless of the request from the host 400 and transmit the command, the address, and the data to the memory device 100. For example, the memory controller 200 may provide the command, the address, and the data for performing a read operation and a program operation accompanying the performing of wear leveling, read reclaim, garbage collection, and the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

A read request provided from the host 400 is requesting to provide original data, which was requested to be stored in the storage device 50 by the host 400, to the host 400 again. The memory controller 200 generates write data including parity data for error correction by performing error correction encoding on the original data. The memory controller 200 may control the memory device 100 to store the write data in the memory device 100.

Thereafter, in response to the read request from the host 400, the memory controller 200 may provide a read command and a physical address indicating a position of memory cells in which the data to be read is stored to the memory device 100, in order to obtain data corresponding to the read request of the host 400 from the memory device 100.

The memory device 100 may perform the read operation using a default read voltage. A read voltage may be a voltage applied to identify data stored in the memory cell. The default read voltage may be a read voltage determined through a test during a manufacturing process of the memory device 100.

The memory device 100 may provide read data obtained by reading the data stored in the received physical address using the default read voltage to the memory controller 200. The memory controller 200 may perform error correction decoding on the read data.

The error correction decoding may be an operation of obtaining the original data by correcting an error bit included in the read data. The error correction decoding may be successful or failed according to whether the number of error bits included in the read data is equal to or less than the number of correctable error bits. When the number of error bits included in the read data is equal to or less than the number of correctable error bits, the error correction decoding may be passed. Conversely, when the number of error bits included in the read data exceeds the number of correctable error bits, the error correction decoding may be failed. When the error correction decoding is passed, the original data corresponding to the logical address requested by the host 400 may be obtained. Therefore, when the error correction decoding is passed, the read operation performed by the memory device 100 may be passed. When the error correction decoding is failed, the original data may not be obtained, and the read operation performed by the memory device 100 may be failed.

When the read operation is failed, the memory controller 200 may perform a plurality of recovery algorithms until the original data is obtained. The plurality of recovery algorithms may be performed according to a preset order. As complexity of the recovery algorithm increases, a possibility that the original data is to be obtained increases. However, since an amount of operations or computations to be performed by the memory controller 200 increases according to the complexity, overhead may also be increased. In an embodiment, the memory controller 200 may perform the recovery algorithms in an order from a recovery algorithm having a low complexity to a recovery algorithm having a high complexity. When the original data is obtained by one of the recovery algorithms, the remaining recovery algorithms may not be performed.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

The memory controller 200 may control the buffer memory 300 to temporarily store data to be stored in the memory device 100 according to a request of the host 400. The data stored in the buffer memory 300 may be stored in a pre-allocated area (not shown) in the buffer memory 300 according to a logical address.

A program unit is defined as a size of data to be programmed into the memory device 100 at a time during a program operation. A size of data provided to the storage device 50 from the host 400 may be different from the program unit. Therefore, the memory controller 200 may store data received according to the program request of the host 400 in the buffer memory 300. Thereafter, when data which is stored in the buffer memory 300 becomes a size of the program unit, the memory controller 200 may control the buffer memory 300 and the memory device 100 to program the data having the program unit size into the memory device 100.

The buffer memory 300 may be a volatile memory device. Therefore, when power is cut off, the data stored in the buffer memory 300 may not be maintained.

Referring to FIG. 1, the buffer memory 300 is included in the storage device 50 and is positioned outside the memory controller 200. However, in various embodiments, the buffer memory 300 may be positioned inside the memory controller 200.

Figure 2:
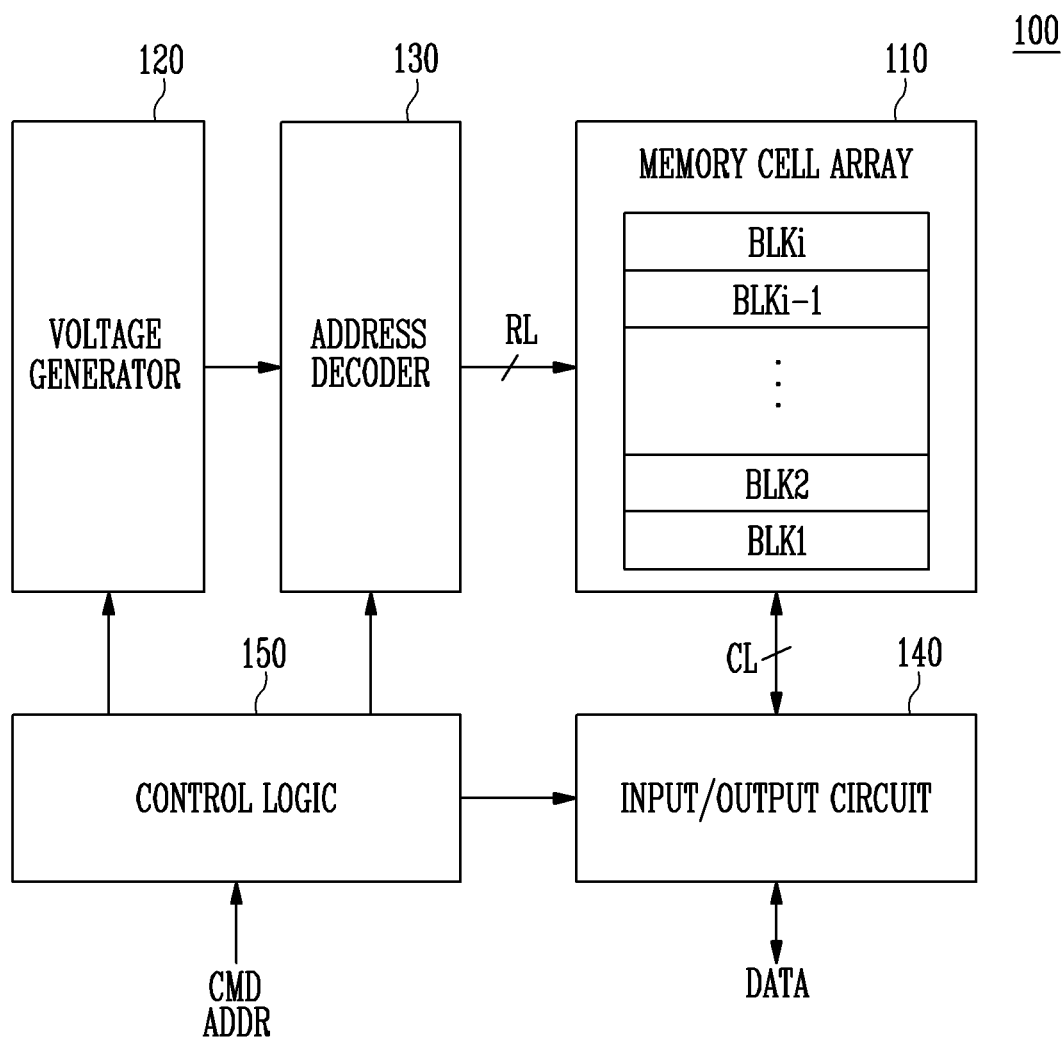
FIG. 2 is a diagram illustrating a memory device of FIG. 1.

FIG. 2 is a diagram illustrating the memory device of FIG. 1.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells.

Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages Vop using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

According to an embodiment of the present disclosure, during the read operation, the address decoder 130 may apply a read voltage to a selected word line and a read pass voltage of a higher level than that of the read voltage to unselected word lines.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate various signals in response to the command CMD and the address ADDR to control the peripheral circuits.

Figure 3:
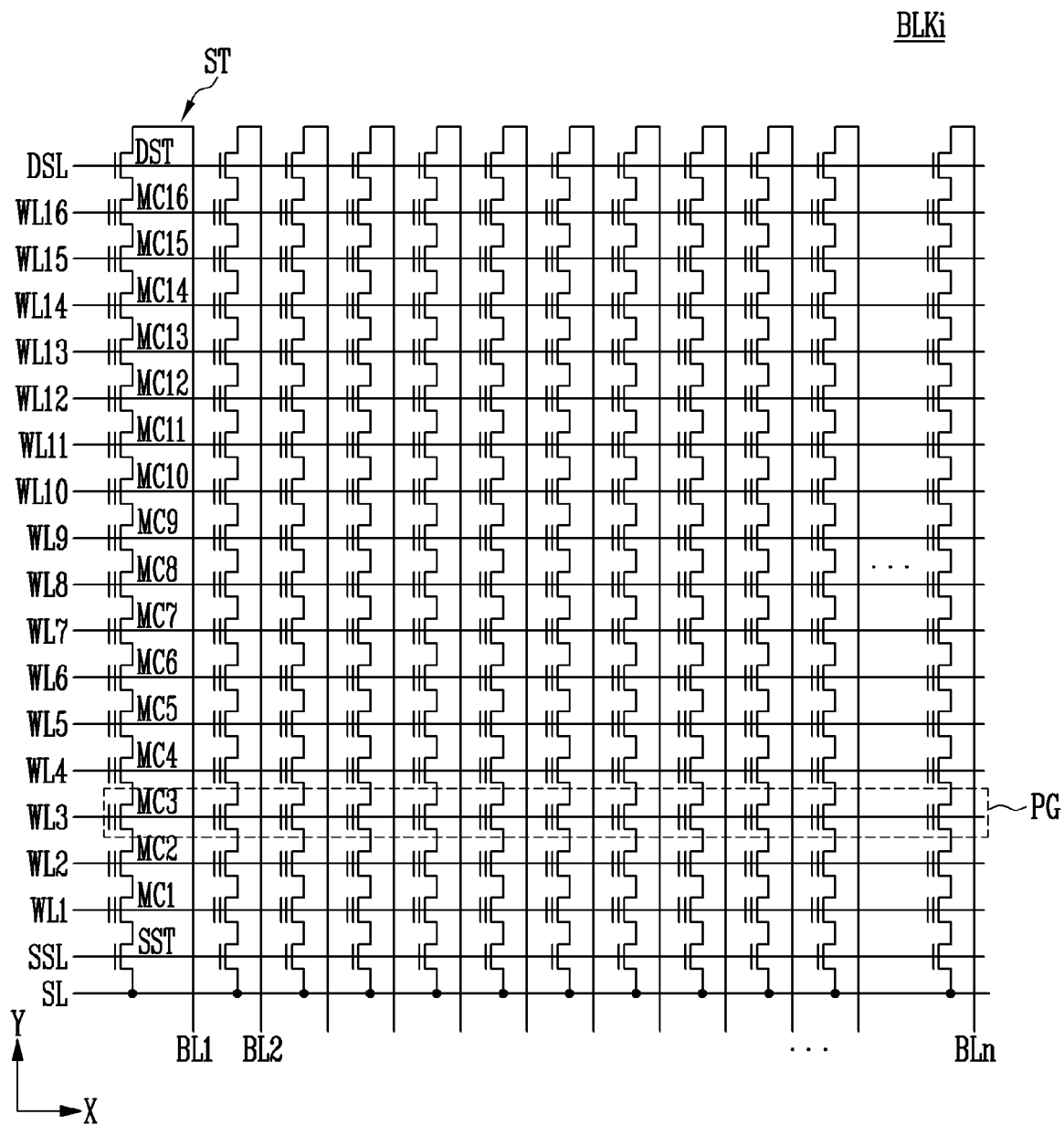
FIG. 3 is a diagram illustrating a structure of one of the memory blocks of FIG. 2.

FIG. 3 is a diagram illustrating a structure of one of the memory blocks of FIG. 2.

The memory block BLKi is one memory block BLKi among the memory blocks BLK1 to BLKi of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include more than the number of the memory cells MC1 to MC16 shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include the pages PG of the number of the word lines WL1 to WL16.

One memory cell may store one bit of data. This is commonly called a single level cell (SLC). In this case, one physical page PG may store one logical page (LPG) data. The one logical page (LPG) data may include data bits having the same number as cells included in one physical page PG.

The one memory cell may store two or more bits of data. In this case, one physical page PG may store two or more logical page (LPG) data.

Figure 4:
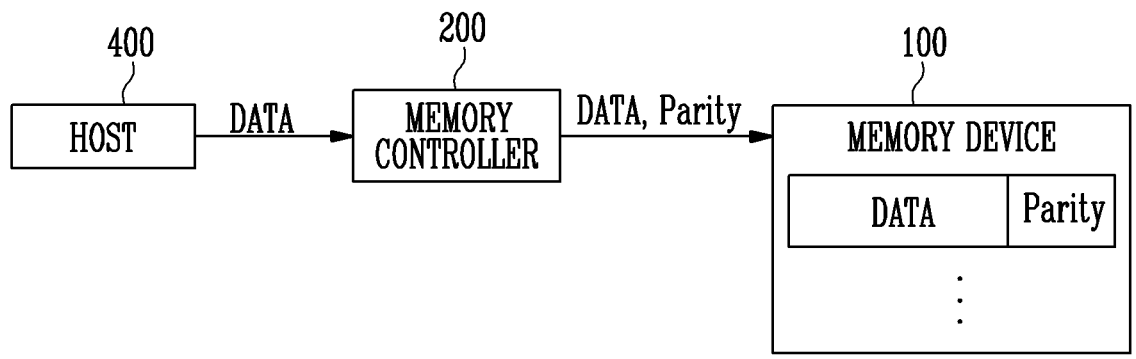
FIG. 4 is a diagram illustrating an example in which a parity is generated according to an embodiment of the present disclosure.

FIG. 4 is a diagram illustrating an example in which a parity is generated according to an embodiment of the present disclosure.

Referring to FIG. 4, the memory controller 200 may generate a parity Parity for data DATA using the data DATA to be stored in the memory device 100. For example, the memory controller 200 may perform an operation for generating the parity Parity by using the data DATA. The operation may include various methods, but in the present embodiment, an exclusive OR (XOR) operation is described as an example.

The exclusive OR operation and a data recovery method is described as follows.

For example, the data DATA may include data first data piece and data second data piece. In this example the first data piece is "1101 0011" and the second data piece is "0011 1011". The memory controller 200 may perform an exclusive OR operation on the first data piece and the second data piece. As a result, the parity Parity "1110 1000" may be generated for the data DATA. Thereafter, the data DATA and the parity Parity may be stored in the memory device 100.

As a result of performing a read operation on the first data piece stored in the memory device 100, an error may occur. In this case, the memory controller 200 may read the second data piece and the parity Parity and perform an exclusive OR (XOR) operation on the second data piece and the parity Parity. That is, when the XOR operation is performed on "0011 1011" and "1110 1000", the first data piece "1101 0011" may be generated. Therefore, the first data piece in which the error occurs may be recovered.

Figure 5A:
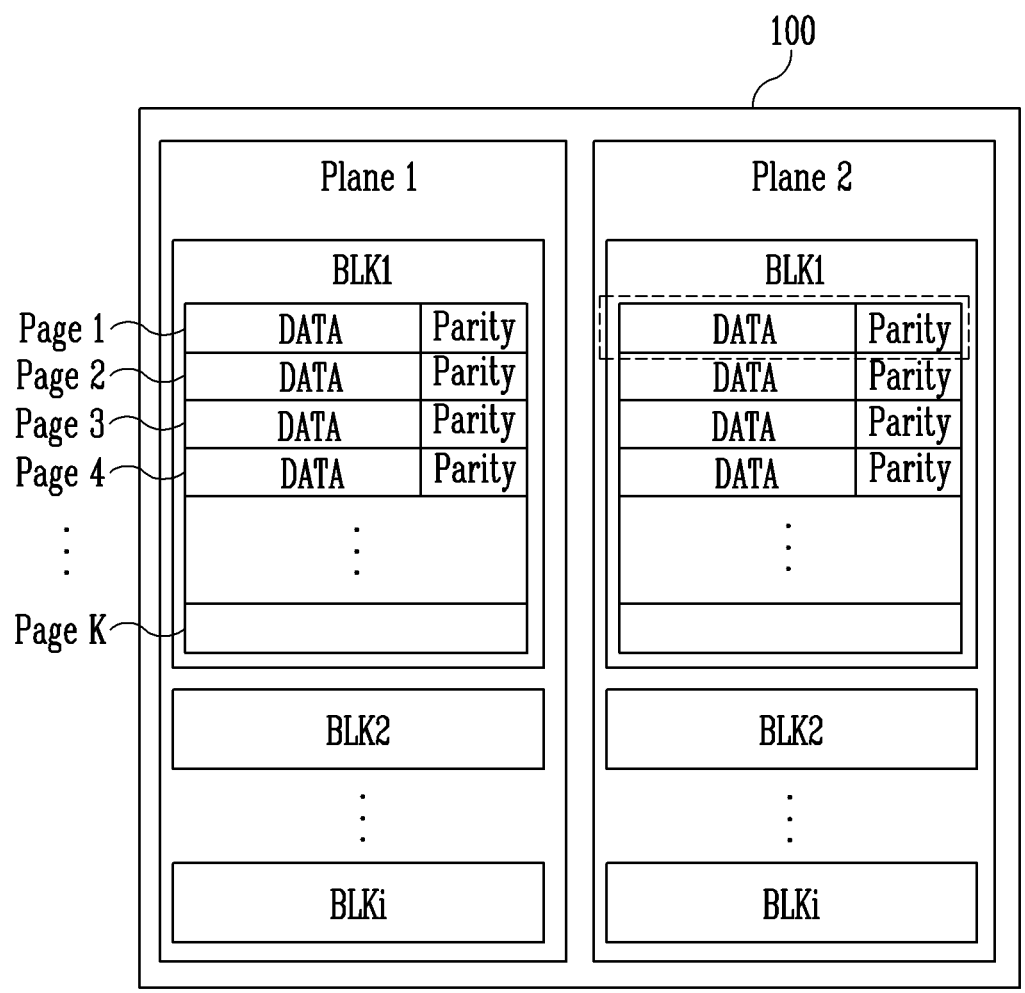
FIGS. 5A to 5C are diagrams illustrating a relationship between data and a parity according to an embodiment of the present disclosure.
Figure 5B:
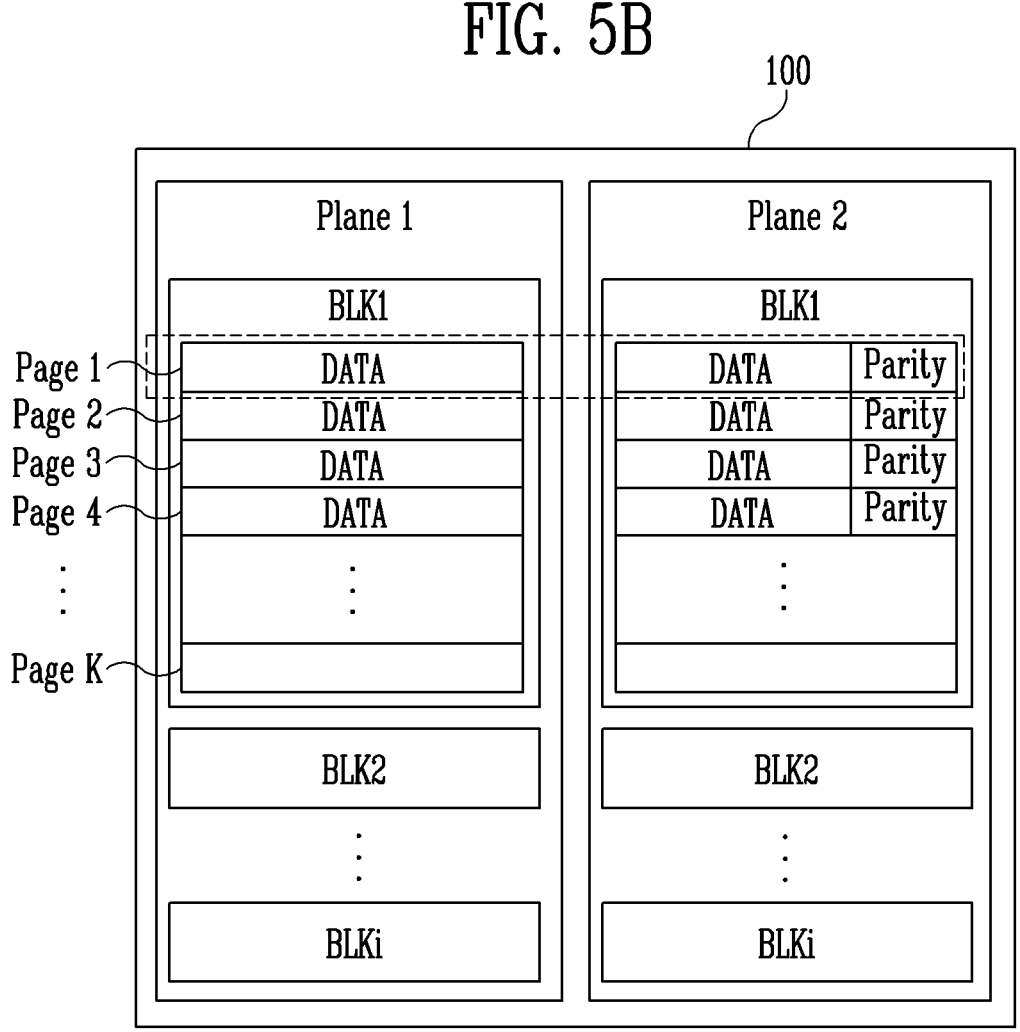
Figure 5C:
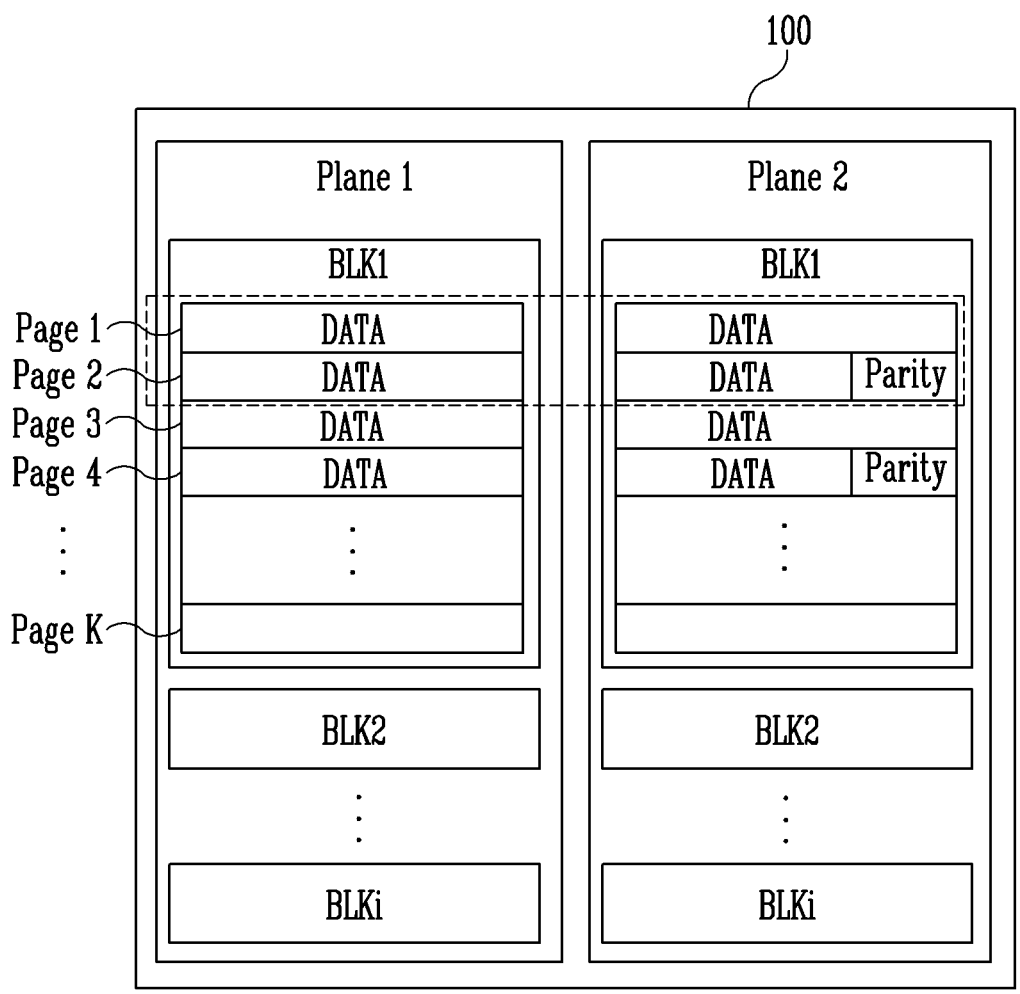

FIGS. 5A to 5C are diagrams illustrating a relationship between data and a parity according to an embodiment of the present disclosure.

In FIGS. 5A to 5C, the memory device 100 may include a plurality of planes. However, for convenience of description, in the present specification, the memory device 100 includes two planes Plane 1 and Plane 2. One plane may include first to i-th memory blocks BLK1 to BLKi, and one memory block may include first to k-th pages Page 1 to Page k.

In an embodiment, one parity may be generated for each data of a preset size.

For example, one parity may be generated for each memory area included in the memory device 100. In an embodiment, the memory device 100 may include a plurality of memory areas. At this time, data may be stored in units of sizes of the memory areas. In addition, parities may be generated in units of the sizes of the memory areas. For example, the memory area may be a page, a memory block, a plane, or the like. The memory area may be variously defined in an initial setting.

FIG. 5A is a diagram illustrating an example in which one parity is generated for each data stored in one page. Referring to FIG. 5A, each page may store the data DATA and a parity Parity for the data DATA. At this time, the parity Parity may be generated by applying an exclusive OR operation on the data DATA stored in one page.

FIG. 5B is a diagram illustrating an example in which one parity is generated for each data stored in two pages. Referring to FIG. 5B, each page may store the data DATA, and one parity Parity may be stored for every two pages. At this time, the parity Parity may be generated by applying an exclusive OR operation on the data DATA stored in two pages.

FIG. 5C is a diagram illustrating an example in which one parity is generated for each data stored in four pages. Referring to FIG. 5C, each page may store the data DATA, and one parity Parity may be stored for every four pages. At this time, the parity Parity may be generated by applying an exclusive OR operation on the data DATA stored in four pages.

In the above-described example, the parity is generated between pages included in different planes, but parity may be generated between pages included in the same planes according to an embodiment.

In addition, in the above-described example, the parity is generated for each page unit, but is not limited thereto, and the parity may be generated for each memory block unit or plane unit according to an embodiment.

Figure 6:
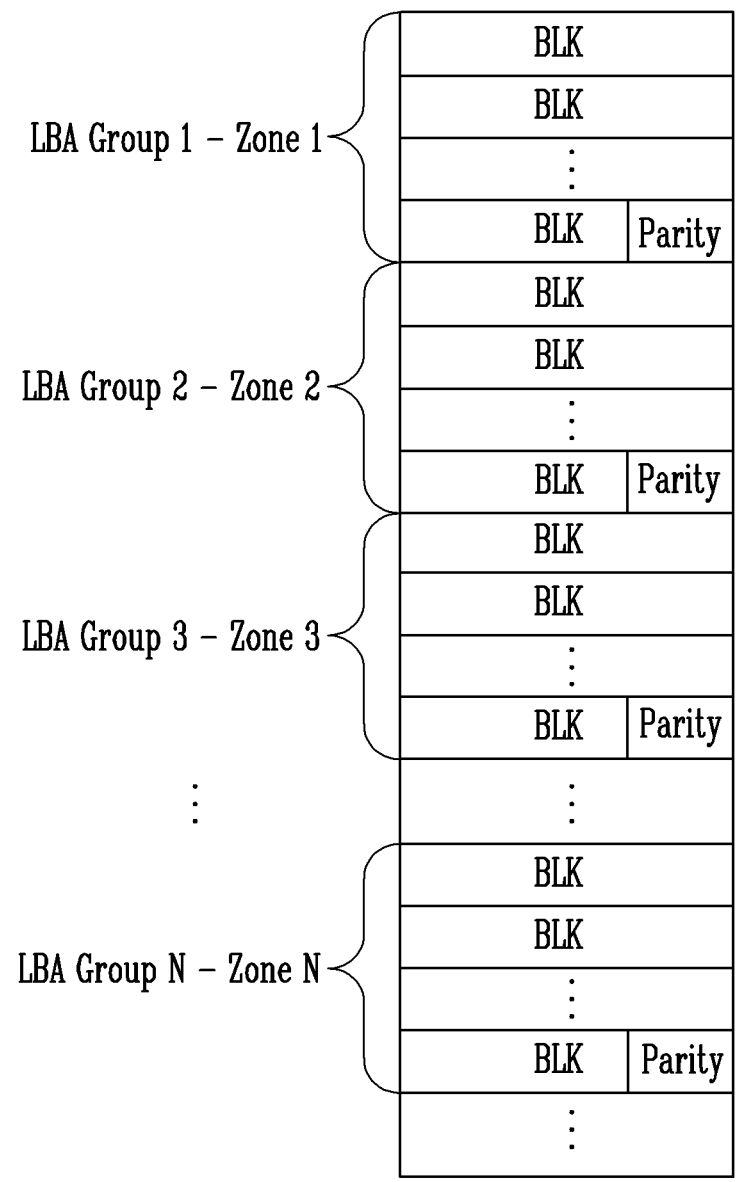
FIG. 6 is a diagram illustrating a concept of a zone and a relationship between the zone and a parity according to an embodiment of the present disclosure.

FIG. 6 is a diagram illustrating a concept of a zone and a relationship between the zone and a parity according to an embodiment of the present disclosure.

In FIG. 6, a plurality of zones may include a first zone Zone 1 to an N-th zone Zone N. Each of the plurality of zones may include a plurality of memory blocks. In an embodiment, the number of memory blocks included in each of the plurality of zones may be different from each other or may be the same. The zone may be a storage area corresponding to a logical address group configured of logical addresses input from the host. Specifically, the plurality of zones may be areas for storing data corresponding to respective logical address groups. For example, the first zone Zone 1 may be an area for storing data corresponding to a first logical address group LBA Group 1. In addition, the second zone Zone 2 may be an area for storing data corresponding to a second logical address group LBA Group 2. In addition, the third zone Zone 3 may be an area for storing data corresponding to a third logical address group LBA Group 3. In addition, the N-th zone Zone N may be an area for storing data corresponding to an N-th logical address group LBA Group N. At this time, each of the logical address groups may include consecutive logical addresses.

In an embodiment, one parity Parity may be generated for each zone. For example, the memory controller 200 may generate the parity Parity for data to be stored in each of the plurality of zones by using the data. Specifically, the memory controller 200 may generate the parity Parity for the data to be stored in each zone by applying an exclusive OR operation on the data.

Figure 7:
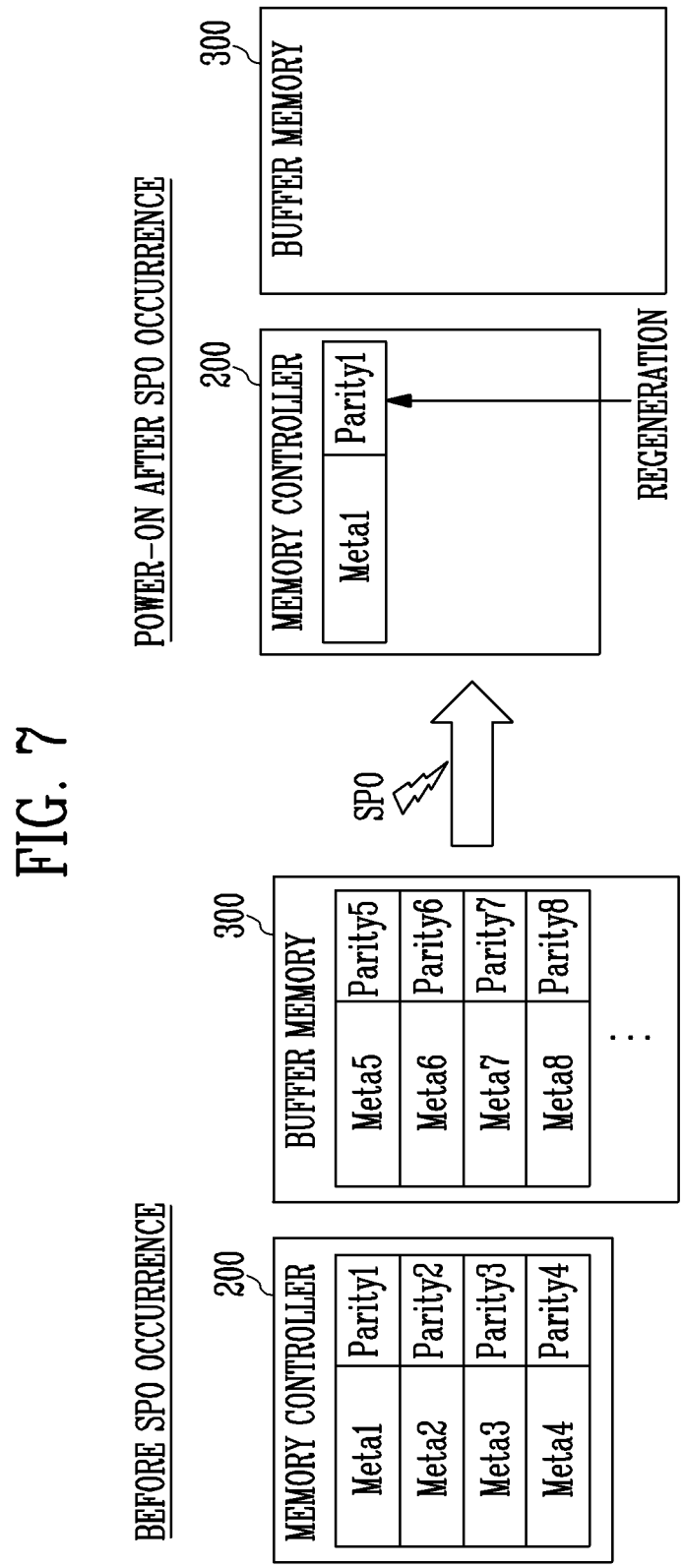
FIG. 7 is a diagram illustrating a sudden power off recovery operation according to an embodiment of the present disclosure.

FIG. 7 is a diagram illustrating a sudden power off recovery operation according to an embodiment of the present disclosure.

In FIG. 7, the memory controller 200 may have a storage capacity capable of storing four pieces of parity information respectively including parities. However, this is only an example, and the storage capacity of the memory controller 200 may vary.

Referring to FIG. 7, parity information may include meta data indicating a memory area and a parity for data stored in the memory area. For example, parity information corresponding to a first memory area may include meta data Meta indicating the first memory area and a parity Parity1 for data stored in the first memory area.

While the storage device 50 is operating, a sudden power off (SPO) in which power is suddenly cut off to the storage device 50 may occur. When power is supplied again after a sudden power off situation occurs, that is, when a power-on situation occurs, the storage device 50 may perform the sudden power off recovery operation.

For example, parity information on a plurality of memory areas is stored in each of the memory controller 200 and the buffer memory 300 before the sudden power off occurs. At this time, when the sudden power off occurs, since parity information stored in the memory controller 200 and the buffer memory 300 is not dumped to the memory device 100, the parity information stored in the memory controller 200 and the buffer memory 300 is lost. Therefore, when the power is turned on after the sudden power off occurs, the memory controller 200 regenerates the parity information on data stored in the plurality of memory areas. At this time, since a size of the parity information to be regenerated increases as a size of the plurality of memory areas increases, there is a concern in that a time for the storage device 50 to boot again due to the sudden power off increases. In addition, as the booting time of the storage device 50 increases, there is a concern in that the host 400 fails to recognize the storage device 50 due to a timeout error occurring in the host 400.

According to an embodiment of the present disclosure, when the sudden power off occurs, some of the parity information stored in the memory controller 200 and the buffer memory 300 may be dumped as much as possible in the memory device 100. After power is turned on, the parity that could not be dumped in the memory device 100 when the sudden power off occurs may be regenerated when receiving a request for data corresponding to the parity. Therefore, an operation speed of the storage device 50 may be improved, and a storage device recognition rate of the host 400 may be increased.

Figure 8:
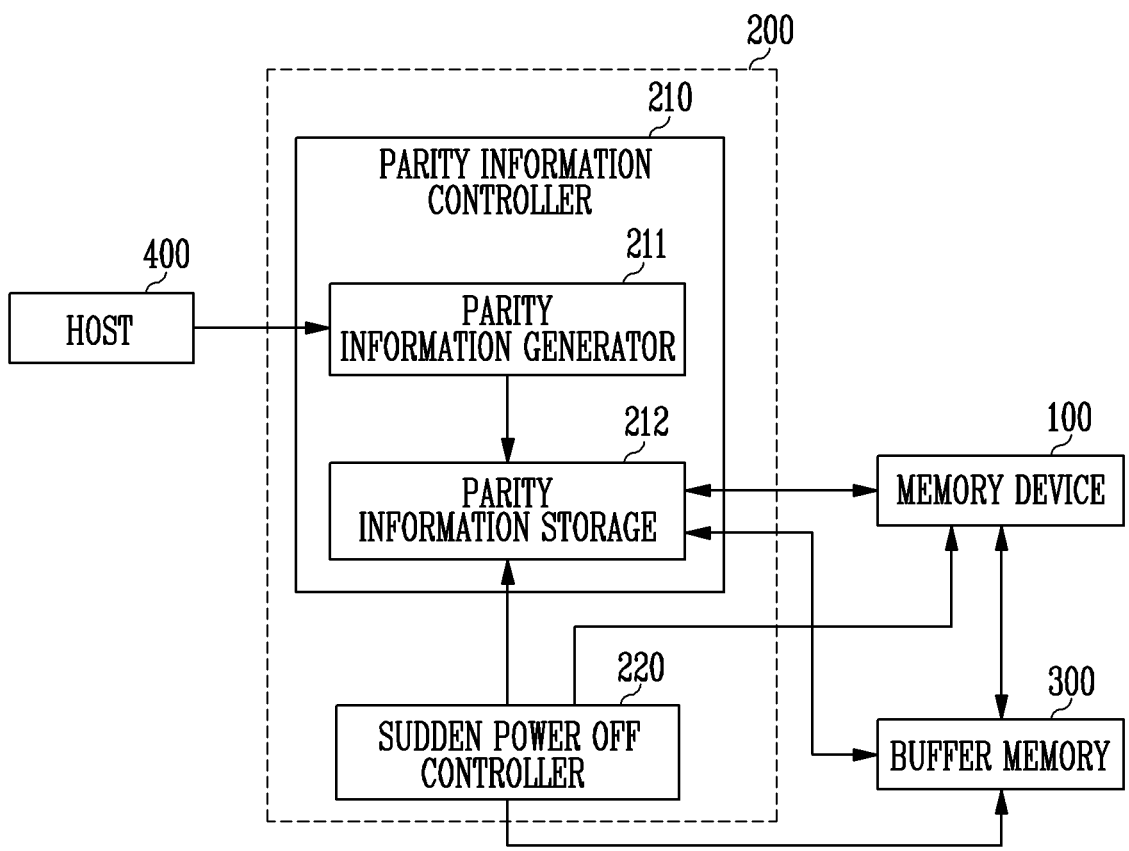
FIG. 8 is a diagram illustrating a memory controller according to an embodiment of the present disclosure.

FIG. 8 is a diagram illustrating a memory controller according to an embodiment of the present disclosure.

The memory device 100, the memory controller 200, the buffer memory 300, and the host 400 shown in FIG. 8 may indicate the memory device 100, the memory controller 200, the buffer memory 300, and the host 400 shown in FIG. 1, respectively.

Referring to FIG. 8, the memory controller 200 may include a parity information controller 210 and a sudden power off controller 220.

The parity information controller 210 may generate a parity for data corresponding to a request input from the host 400. In an embodiment, the request input from the host 400 may include at least one of a read request and a program request. In an embodiment, the parity information controller 210 may be implemented using an XOR acceleration engine.

In an embodiment, the parity information controller 210 may include a parity information generator 211 and a parity information storage 212.

In an embodiment, the parity information generator 211 may calculate the parities for the data to be stored in the respective memory areas. For example, the parity information generator 211 may perform exclusive OR operations using the data to be stored in the respective memory areas. The parity information generator 211 may generate the parities for the data to be stored in the respective memory areas according to the exclusive OR operations.

In an embodiment, the parity information generator 211 may generate first parity information including a parity for data stored in each of one or more first memory areas among the plurality of memory areas. Thereafter, the parity information generator 211 may provide the first parity information to the parity information storage 212.

The parity information storage 212 may store the first parity information.

In addition, the parity information generator 211 may generate second parity information including a parity for data stored in each of one or more second memory areas except for the one or more first memory areas among the plurality of memory areas.

At this time, when a space for storing the parity does not exist in the parity information storage 212, the parity information controller 210 may provide some of the first information from the parity information storage 212 to the memory device 100 or the buffer memory 300. For example, when the parity information storage 212 provides the first parity information to the memory device 100, the memory device 100 may store the first parity information. In addition, when the parity information storage 212 provides the first parity information to the buffer memory 300, the buffer memory 300 may store the first parity information.

Thereafter, when a storage space is created in the parity information storage 212, the parity information generator 211 may provide the second parity information to the parity information storage 212. The parity information storage 212 may store the second parity information.

The parity information stored in each of the parity information storage 212, the memory device 100, and the buffer memory 300 may be different from each other. That is, the parity information storage 212, the memory device 100, and the buffer memory 300 may store parity for different data.

When the sudden power off occurs, the sudden power off controller 220 may sense the occurrence of the sudden power off and perform the sudden power off recovery operation.

In an embodiment, when the sudden power off occurs, the sudden power off controller 220 may control the memory device 100 to store dump parity information in the memory device 100. The dump parity information may include some of the first parity information and the second parity information. At this time, the dump parity information may be parity information stored in the memory device 100 when the sudden power off occurs. In an embodiment, the dump parity information may include the second parity information, which is the parity information stored in the parity information storage 212. In addition, in an embodiment, the dump parity information may include some of the first parity information, which is the parity information stored in the buffer memory 300.

For example, when the sudden power off occurs, the sudden power off controller 220 may control the memory device 100 to store some of the first and second parity information, which are stored in the parity information storage 212 and the buffer memory 300, in the memory device 100. Specifically, the sudden power off controller 220 may control the memory device 100 and the parity information storage 212 to store the second parity information, which is stored in the parity information storage 212, in the memory device 100. In addition, after providing the second parity information to the memory device 100, the sudden power off controller 220 may provide some of the first parity information stored in the buffer memory 300 to the memory device 100. That is, according to a capacity of an emergency power supply device (not illustrated) such as a POSCAP that temporarily supplies power when the sudden power off occurs, an amount of the parity information to be dumped from the parity information storage 212 and the buffer memory 300 to the memory device 100 may be different.

In an embodiment, the sudden power off controller 220 may control the memory device 100 to provide the dump parity information to the parity information storage 212 when power is turned on after the sudden power off occurs. Specifically, the sudden power off controller 220 may perform a "rebuild operation" of providing the dump parity information stored in the memory device 100 to the parity information storage 212 again when power is turned on after the sudden power off occurs. Accordingly, even though the sudden power off occurs, some parity information may be stored in the memory device 100, thereby reducing a time required to generate the parity.

Among the parities stored in the parity information storage 212 and the buffer memory 300, remaining parities except for the parities included in the dump parity information are lost by the sudden power off. Therefore, a method for recovering the lost parities after power is turned on is necessary.

In an embodiment, the parity information generator 211 may generate the parity for the data corresponding to the request input from the host 400 when the parity for the data corresponding to the request input from the host 400 does not exist in the dump parity information after power is turned on.

For example, when the parity for the data corresponding to the request input from the host 400 does not exist in the parity information storage 212 and the buffer memory 300, the parity information generator 211 may generate the parity for the data corresponding to the request input from the host 400.

In addition, in an embodiment, the memory device 100 may store third parity information including a parity for data stored in each of one or more third memory areas except for the one or more first memory areas and the one or more second memory areas among the plurality of memory areas. For example, the third parity information may include the parities that are not stored in the parity information storage 212 and the buffer memory 300. The parity information generator 211 may generate the third parity information using the data stored in each of one or more third memory areas. Thereafter, the parity information generator 211 may provide the third parity information to the memory device 100.

Specifically, the memory device 100 may store the parities that are not stored in the parity information storage 212 and the buffer memory 300. At this time, each parity stored in the memory device 100 may be generated using data having a preset size. The preset size may be a size of data for generating one parity. For example, the preset size may be the size of a memory area except for the size of the one parity. In another example, the preset size may be the size of a zone except for the size of the one parity.

In an embodiment, the parity information generator 211 may generate the parity for the data corresponding to the request input from the host 400 when the parity for the data corresponding to the request input from the host 400 does not exist in the dump parity information and the third parity information.

For example, when the parity for the data corresponding to the request input from the host 400 does not exist in the memory device 100, the parity information storage 212, and the buffer memory 300, the parity information generator 211 may generate the parity for the data corresponding to the request input from the host 400.

According to an embodiment of the present disclosure, the lost parity may be regenerated according to the request input from the host 400. Therefore, an operation time of the storage device 50 may be reduced when power is turned on, thereby providing the storage device 50 having an improved operation speed.

Figure 9:
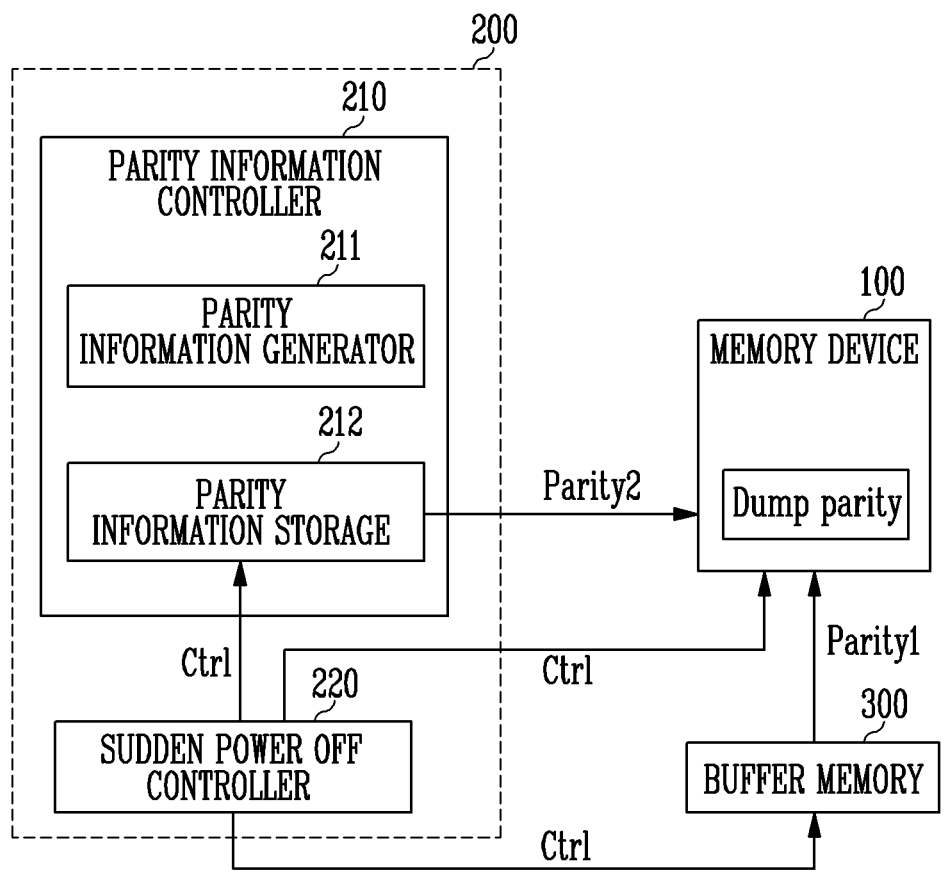
FIG. 9 is a diagram illustrating an operation of a memory controller when a sudden power off occurs according to an embodiment of the present disclosure.

FIG. 9 is a diagram illustrating an operation of a memory controller when a sudden power off occurs according to an embodiment of the present disclosure.

Referring to FIG. 9, the sudden power off controller 220 may sense the sudden power off. At this time, the sudden power off controller 220 may transfer a control signal Ctrl to each of the parity information storage 212, the memory device 100, and the buffer memory 300.

For example, the sudden power off controller 220 may control the parity information storage 212 to provide second parity information Parity2 stored in the parity information storage 212 to the memory device 100. In addition, the sudden power off controller 220 may control the memory device 100 to store the second parity information Parity2.

In addition, the sudden power off controller 220 may control the buffer memory 300 to provide some of the first parity information Parity1 stored in the buffer memory 300 to the memory device 100. In addition, the sudden power off controller 220 may control the memory device 100 to store the first parity information Parity1. That is, during a time in which power may be maintained through an emergency power supply device (not shown), the sudden power off controller 220 may store as much parity information as possible among the first and second parity information, which are stored in the parity information storage 212 and the buffer memory 300, in the memory device 100.

Accordingly, the memory device 100 may store dump parity information Dump parity including some of the first parity information Parity1 and the second parity information Parity1.

Figure 10:
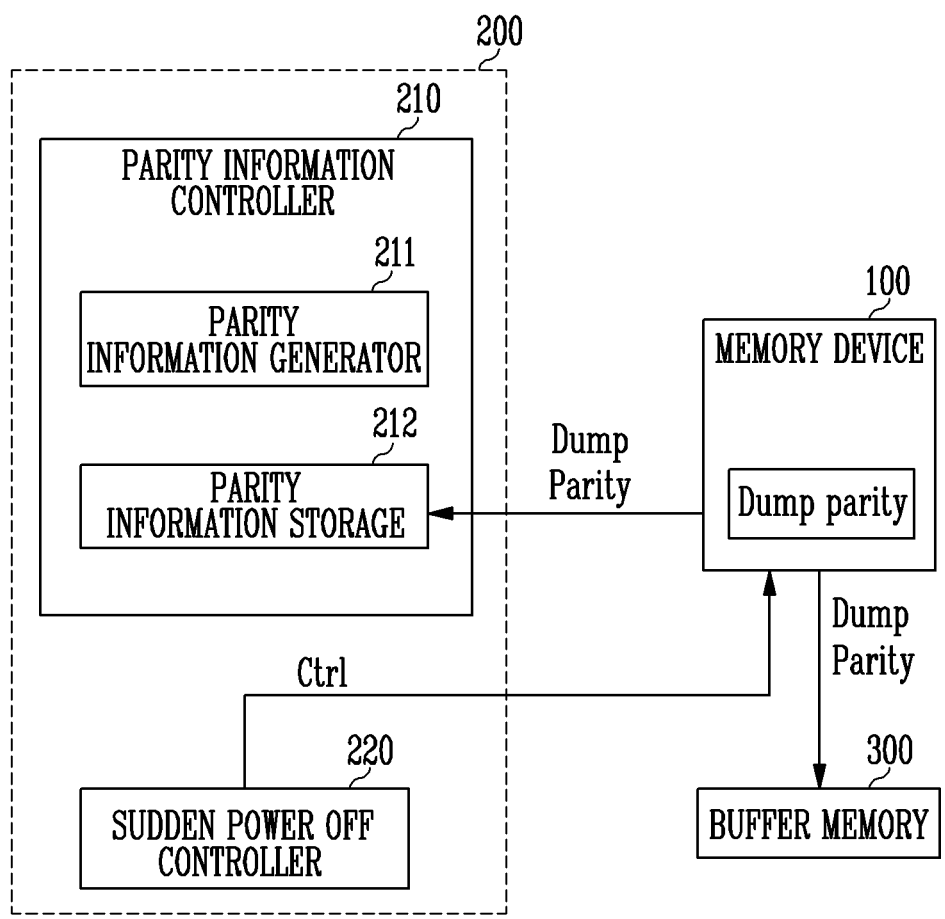
FIG. 10 is a diagram illustrating an operation of a memory controller when power is turned on according to an embodiment of the present disclosure.

FIG. 10 is a diagram illustrating an operation of a memory controller when power is turned on according to an embodiment of the present disclosure.

Referring to FIG. 10, when power is turned on after the sudden power off occurs, the sudden power off controller 220 may control the memory device 100 to read the dump parity information Dump parity stored in the memory device 100. For example, the sudden power off controller 220 may transfer the control signal Ctrl to the memory device 100 to control the memory device 100 to provide the dump parity information Dump parity to the parity information storage 212.

In addition, in an embodiment, the sudden power off controller 220 may transfer the control signal Ctrl to the memory device 100 to control the memory device 100 to provide the dump parity information Dump parity to the buffer memory 300. For example, when a size of the dump parity information Dump parity exceeds a storage capacity of the parity information storage 212, the sudden power off controller 220 may control the memory device 100 to provide the dump parity information Dump parity to the buffer memory 300.

Figure 11A:
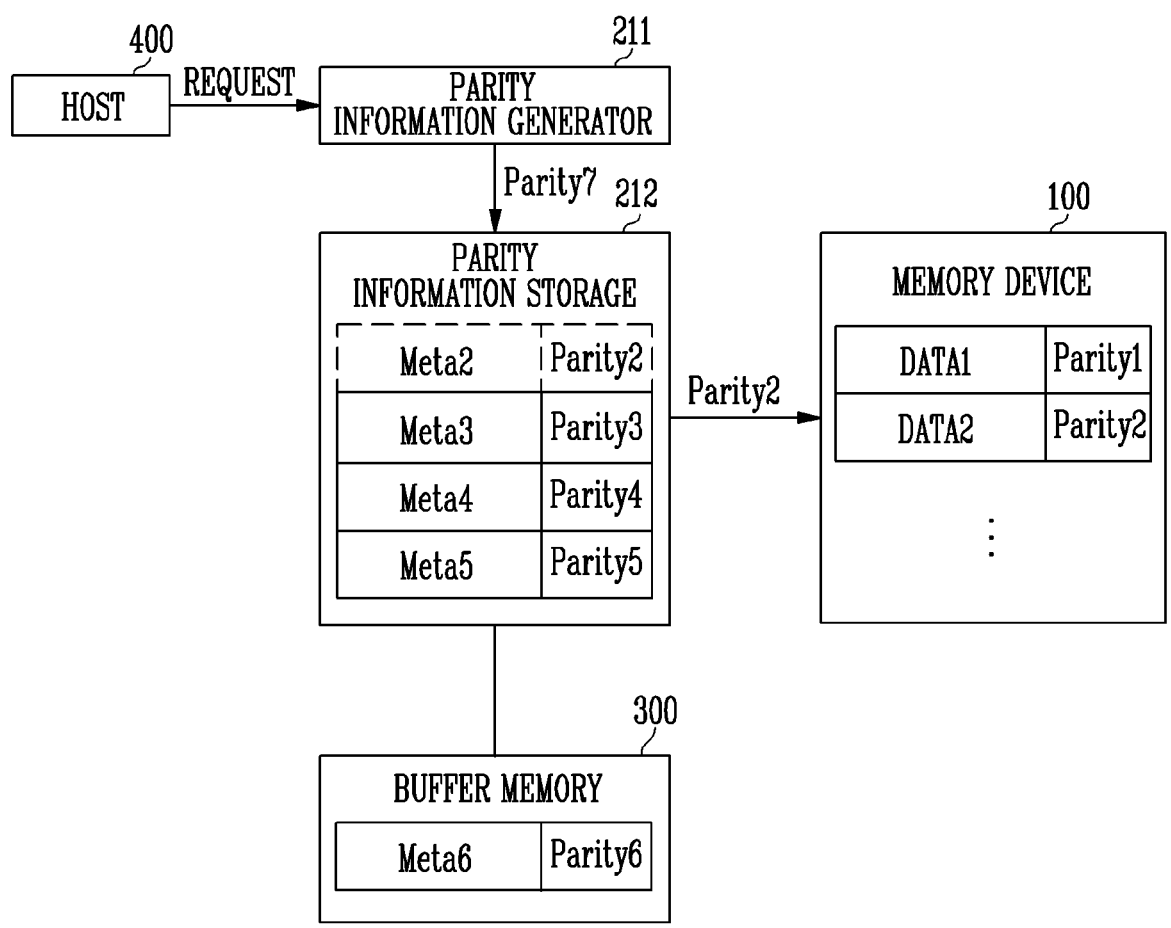
FIGS. 11A and 11B are diagrams illustrating an example in which a parity is regenerated according to an embodiment of the present disclosure.
Figure 11B:
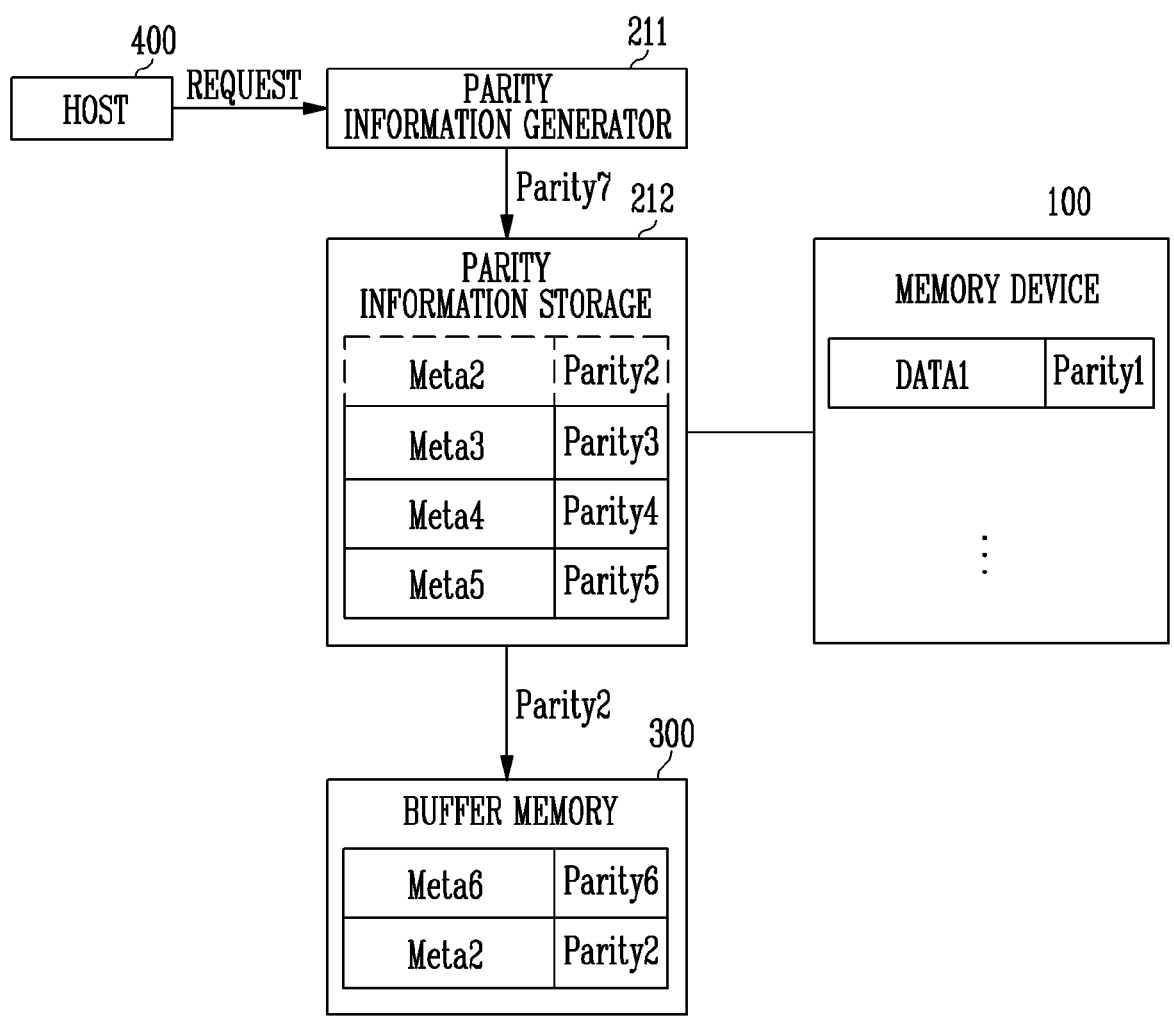

FIGS. 11A and 11B are diagrams illustrating an example in which a parity is regenerated according to an embodiment of the present disclosure.

In FIGS. 11A and 11B, the parity information storage 212 stores four pieces of parity information respectively including parities and therefore becomes full of the parity information. In addition, in FIGS. 11A and 11B, power is turned on after the sudden power off occurs.

FIG. 11A is a diagram illustrating an example in which one parity stored in the parity information storage 212 is provided to the memory device 100 to regenerate the parity.

Referring to FIG. 11A, in an embodiment, when a size of the parity information stored in the parity information storage 212 is equal to or greater than a threshold value when the request is input from the host 400, the parity information controller 210 may provide the parity generated by using data having a preset size among the parity information stored in the parity information storage 212 to the memory device 100. At this time, the preset size may indicate a size of data for generating one parity. In addition, the threshold value may indicate the storage capacity of the parity information storage 212.

For example, when receiving the request REQUEST from the host 400, the parity information generator 211 may check a parity for data corresponding to the request REQUEST in the memory device 100, the parity information storage 212, and the buffer memory 300. When the parity for the data corresponding to the request REQUEST does not exist in any of the memory device 100, the parity information storage 212, and the buffer memory 300, the parity information generator 211 may generate the parity for the data. For example, if the request is a read request, the parity information generator 211 may generate the parity by using the data read from the memory device 100. In another example, if the request is a program request, the parity information generator 211 may generate the parity by using the data provided from the host 400.

At this time, since a space for storing the parity does not exist in the parity information storage 212, the parity information controller 210 may provide one parity from the parity information storage 212 to one of the memory device 100 and the buffer memory 300. For example, when the second parity Parity2 is generated by using data having the preset size, the parity information controller 210 may provide the second parity Parity2 from the parity information storage 212 to the memory device 100. In addition, the memory device 100 may store the second parity Parity2 together with second data DATA2.

Thereafter, the parity information generator 211 may generate a seventh parity Parity7 for data corresponding to the request REQUEST, and provide the seventh parity Parity7 to the parity information storage 212.

FIG. 11B is a diagram illustrating an example in which one parity stored in the parity information storage 212 is provided to the buffer memory 300 to regenerate the parity.

Referring to FIG. 11B, in an embodiment, when any parity generated by using the data having the preset size does not exist in the parity information storage 212, the parity information controller 210 may provide, from the parity information storage 212 to the buffer memory 300, a parity for data stored in a least recently accessed memory area among the parity information stored in the parity information storage 212.

For example, when receiving the request REQUEST from the host 400, the parity information generator 211 may check a parity for data corresponding to the request REQUEST in the memory device 100, the parity information storage 212, and the buffer memory 300. When the parity for the data corresponding to the request REQUEST does not exist in any of the memory device 100, the parity information storage 212, and the buffer memory 300, the parity information generator 211 may generate the parity for the data. For example, if the request is a read request, the parity information generator 211 may generate the parity by using the data read from the memory device 100. In another example, if the request is a program request, the parity information generator 211 may generate the parity by using the data provided from the host 400.

At this time, since a space for storing the parity does not exist in the parity information storage 212, the parity information controller 210 may provide one parity from the parity information storage 212 to one of the memory device 100 and the buffer memory 300. For example, when any parity generated by using the data having the preset size does not exist in the parity information storage 212, the parity information controller 210 may provide, from the parity information storage 212 to the buffer memory 300, parity information including a parity for data stored in a least recently accessed memory area. Specifically, when the second memory area corresponding to the second parity Parity2 is the least recently accessed memory area, the second parity Parity2 may be provided to the buffer memory 300. In addition, the buffer memory 300 may store the second parity Parity2 together with meta data Metal for the second memory area.

Thereafter, the parity information generator 211 may generate a seventh parity Parity7 for data corresponding to the request REQUEST, and provide the seventh parity Parity7 to the parity information storage 212.

FIG. 12 is a diagram illustrating a method of operating a storage device according to an embodiment of the present disclosure.

The method shown in FIG. 12 may be performed, for example, by the storage device 50 shown in FIG. 1.

Referring to FIG. 12, in operation S1201, the storage device 50 may store the parity information including the parity for the data, which is stored in the plurality of memory areas, in the buffer memory 300 and the memory controller 200. At this time, the memory controller 200 and the buffer memory 300 may store parities for different data.

In operation S1203, the storage device 50 may sense the sudden power off.

In operation S1205, the storage device 50 may store some of the parities included in the parity information in the memory device 100 in response to the sudden power off. For example, the storage device 50 may store the parities, which are stored in the memory controller 200, in the memory device 100. In addition, the storage device 50 may also store some of the parities, which are stored in the buffer memory 300, in the memory device 100.

In operation S1207, the storage device 50 may provide some parities stored in the memory device 100 to the memory controller 200 in response to the power-on after the sudden power off. In addition, when a space for storing the parity does not exist in the memory controller 200, the storage device 50 may provide some parities stored in the memory device 100 to the buffer memory 300.

In operation S1209, the storage device 50 may regenerate the parity for the data corresponding to the request input from the host 400, according to whether the parity for the data corresponding to the request input from the host 400 is included in some parities stored in at least one of the memory device 100, the memory controller 200, or the buffer memory 300.

Figure 13:
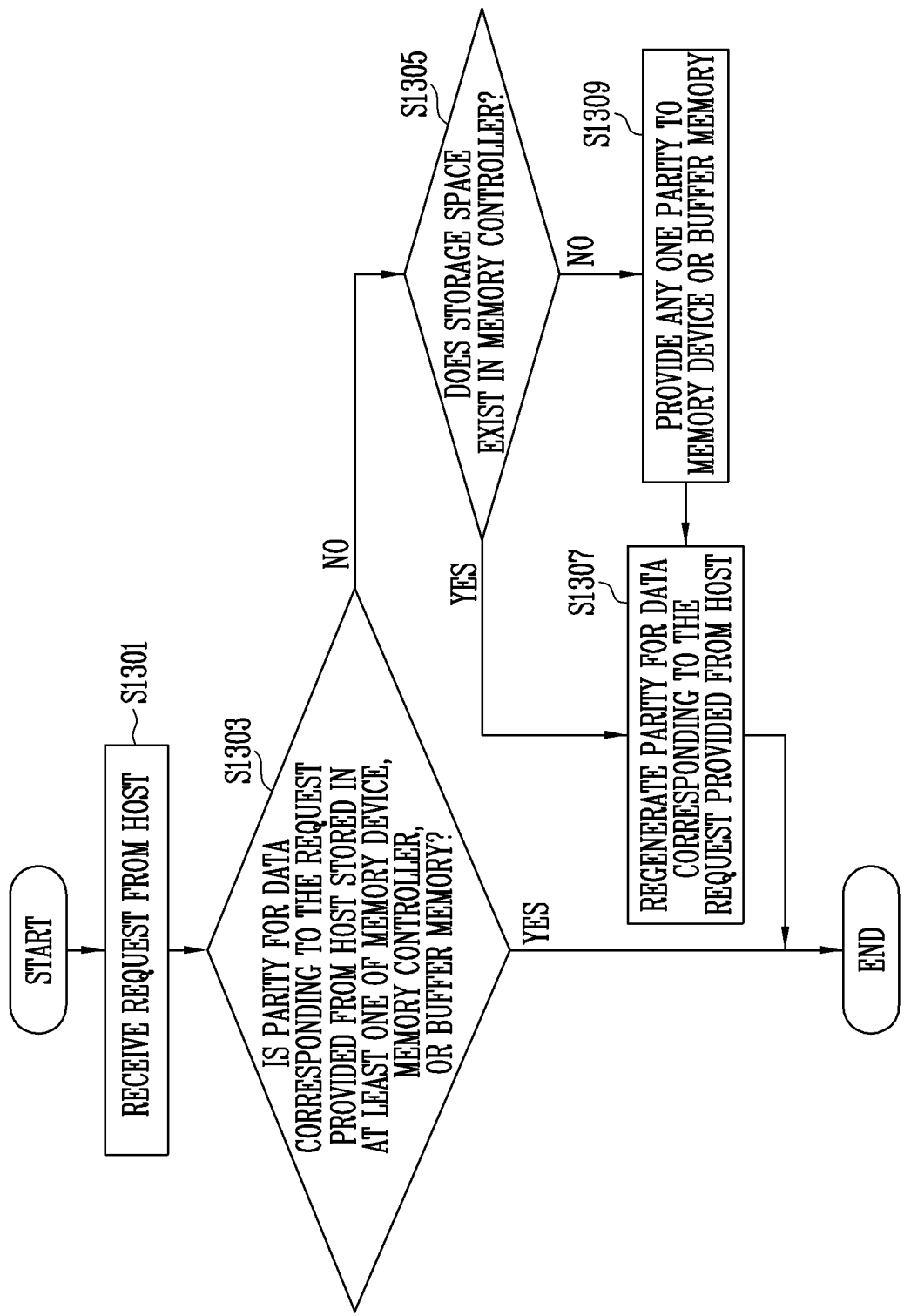
FIG. 13 is a flowchart illustrating a method of regenerating a parity according to an embodiment of the present disclosure.

FIG. 13 is a flowchart illustrating a method of regenerating a parity according to an embodiment of the present disclosure.

For example, the flowchart shown in FIG. 13 may be a flowchart in which operation S1209 shown in FIG. 12 is embodied.

The method shown in FIG. 13 may be performed, for example, by the storage device 50 shown in FIG. 1.

Referring to FIG. 13, in operation S1301, the storage device 50 may receive the request from the host 400. At this time, the request may be the read request or the program request.

In operation S1303, the storage device 50 may check whether the parity for the data corresponding to the request is stored in at least one of the memory device 100, the memory controller 200, and the buffer memory 300.

According to a result of the check in operation S1303, when the parity for the data corresponding to the request exists in at least one of the memory device 100, the memory controller 200, and the buffer memory 300, the operation may be ended.

According to the result of the check in operation S1303, when the parity for the data corresponding to the request does not exist in any of the memory device 100, the memory controller 200, and the buffer memory 300, operation S1305 may be performed.

In operation S1305, the storage device 50 may check whether a storage space exists in the memory controller 200.

According to a result of the check in operation S1305, when the storage space exists in the memory controller 200, in operation S1307, the storage device 50 may regenerate the parity for the data provided from the host 400.

According to the result of the check in operation S1305, when the storage space does not exist in the memory controller 200, in operation S1309, the storage device 50 may provide one parity stored in the memory controller 200 to the memory device 100 or the buffer memory 300. Thereafter, in operation S1307, the storage device 50 may regenerate the parity for the data provided from the host 400.

Figure 14:
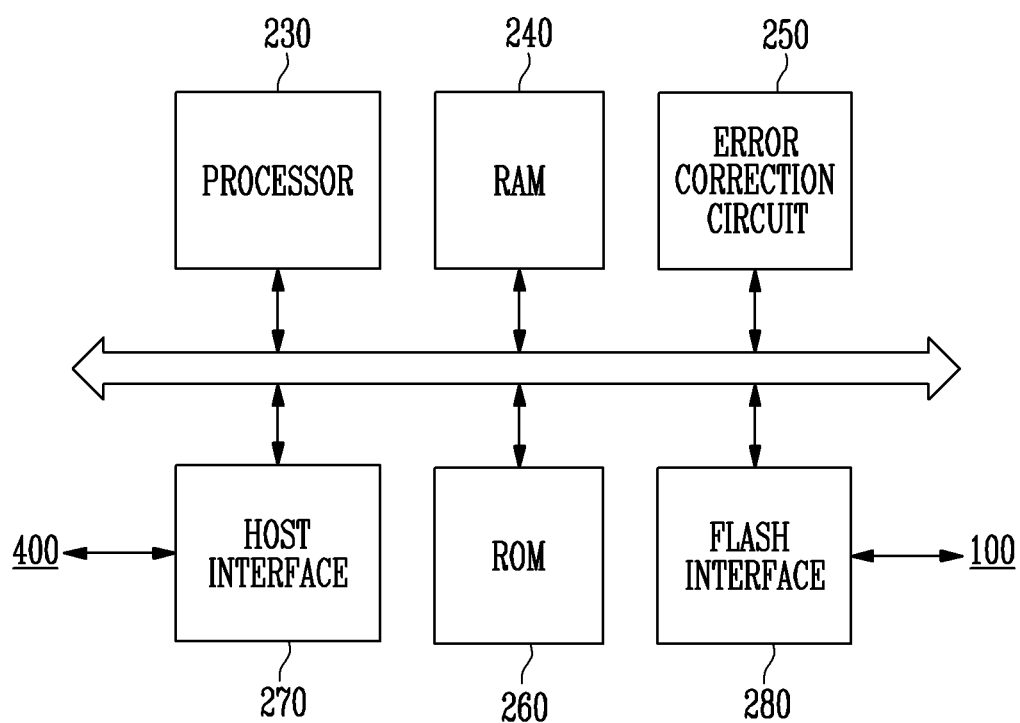
FIG. 14 is a diagram illustrating a memory controller of FIG. 1.

FIG. 14 is a diagram illustrating the memory controller of FIG. 1.

Referring to FIGS. 1 and 14, the memory controller 200 may include a processor 230, a RAM 240, an error correction circuit 250, a ROM 260, a host interface 270, and a flash interface 280.

The processor 230 may control an overall operation of the memory controller 200. The RAM 240 may be used as a buffer memory, a cache memory, an operation memory, and the like of the memory controller 200.

The ROM 260 may store various pieces of information required for the memory controller 200 to operate in a firmware form. In an embodiment, the parity information controller 210 and the sudden power off controller 220 described with reference to FIG. 8 may be firmware stored in the ROM.

The memory controller 200 may communicate with an external device (for example, the host 400, an application processor, and the like) through the host interface 270.

The memory controller 200 may communicate with the memory device 100 through the flash interface 280. The memory controller 200 may transmit a command CMD, an address ADDR, a control signal CTRL, and the like to the memory device 100 and receive data DATA through the flash interface 280. For example, the flash interface 280 may include a NAND interface.

Figure 15:
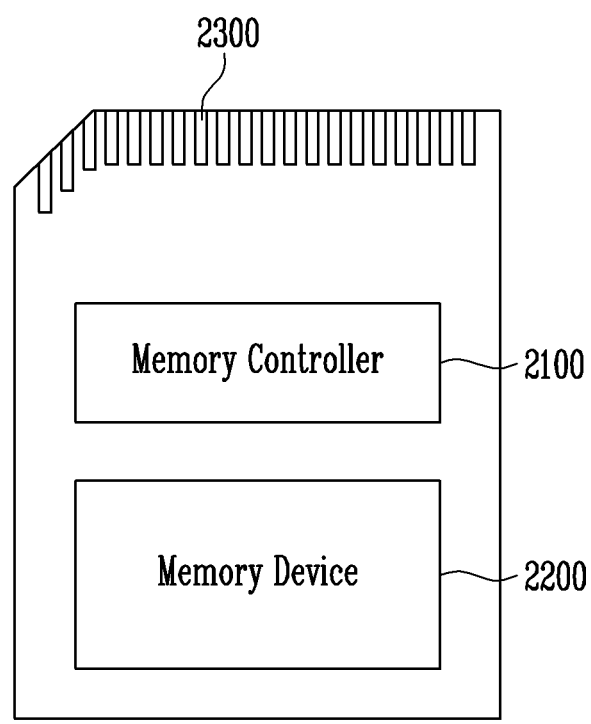
FIG. 15 is a block diagram illustrating a memory card system to which a storage device is applied according to an embodiment of the present disclosure.

FIG. 15 is a block diagram illustrating a memory card system to which a storage device is applied according to an embodiment of the present disclosure.

Referring to FIG. 15, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 16:
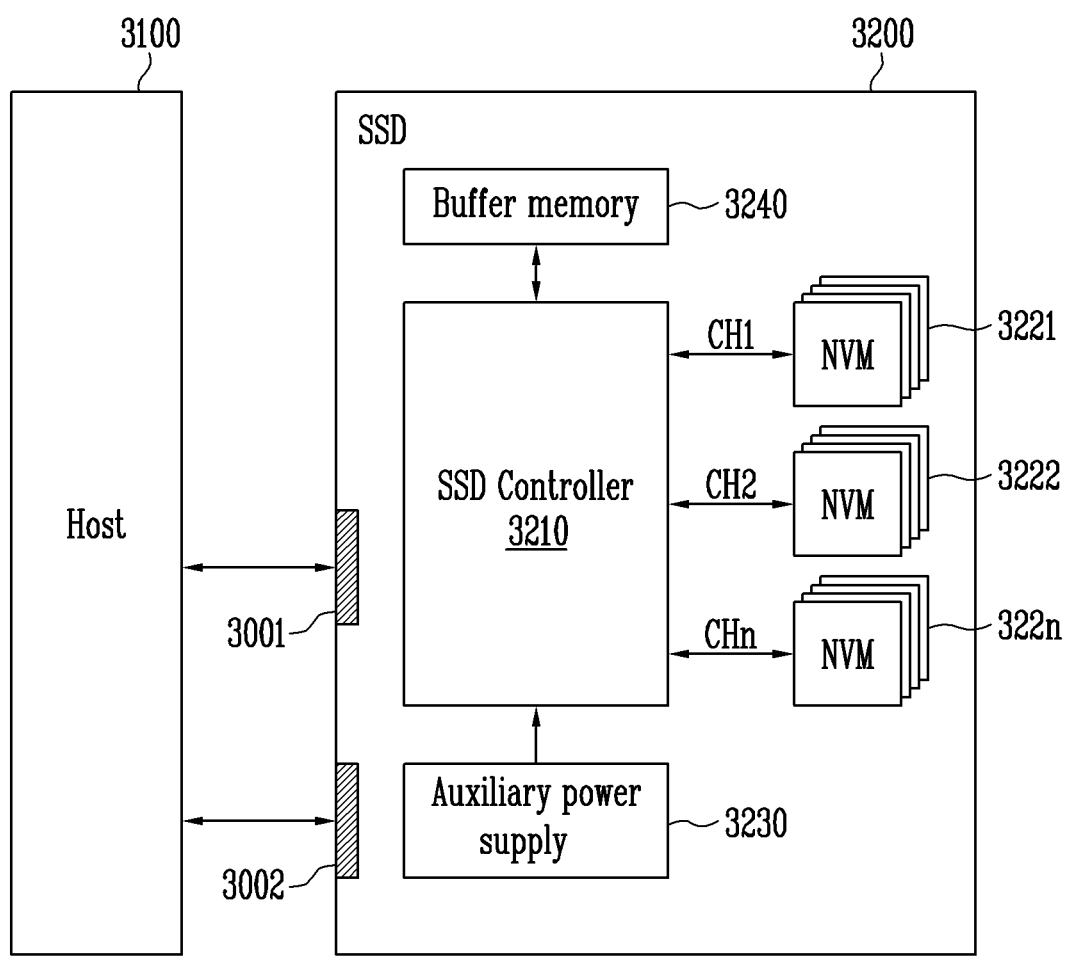
FIG. 16 is a block diagram illustrating a solid state drive (SSD) system to which a storage device according to an embodiment of the present disclosure is applied.

FIG. 16 is a block diagram illustrating a solid state drive (SSD) system to which a storage device is applied according to an embodiment of the present disclosure.

Referring to FIG. 16, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power PWR from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 17:
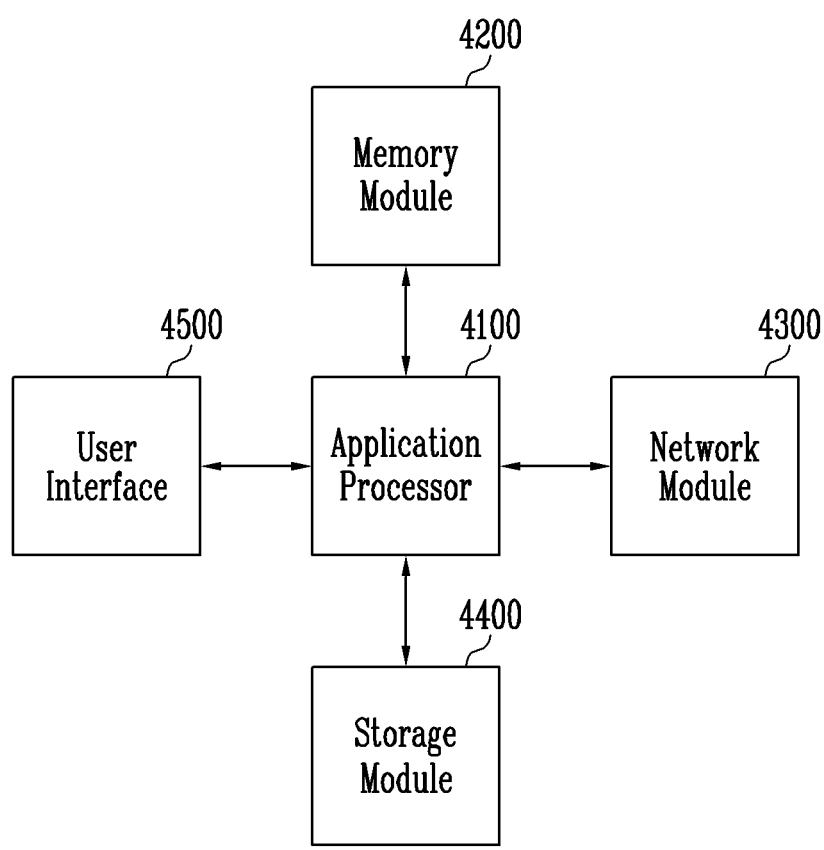
FIG. 17 is a block diagram illustrating a user system to which a storage device is applied according to an embodiment of the present disclosure.

FIG. 17 is a block diagram illustrating a user system to which a storage device is applied according to an embodiment of the present disclosure.

Referring to FIG. 17, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A storage device comprising:
   a memory device including a plurality of memory areas;
   a buffer memory configured to store first parity information including a parity for data stored in each of one or more first memory areas among the plurality of memory areas; and
   a memory controller configured to store second parity information including a parity for data stored in each of one or more second memory areas except for the one or more first memory areas among the plurality of memory areas, control the memory device to store, when a sudden power off occurs, dump parity information including the second parity information, receive the dump parity information from the memory device in response to power-on after the sudden power off occurs, and regenerate, when a parity for data corresponding to a request input from a host does not exist in the dump parity information stored in the memory controller after power is turned on, the parity for the data corresponding to the request input from the host.

2. The storage device of claim 1, wherein the dump parity information further includes the first parity information.

3. The storage device of claim 1, wherein the memory controller is further configured to generate the first parity information and the second parity information by generating a parity for data to be stored in the first memory areas and the second memory areas and provide the first parity information to the buffer memory.

4. The storage device of claim 1,
   wherein the memory device is configured to store third parity information including a parity for data stored in each of one or more third memory areas except for the one or more first memory areas and the one or more second memory areas among the plurality of memory areas, and
   wherein when the parity for the data corresponding to the request input from the host does not exist in the third parity information, the memory controller regenerates the parity for the data corresponding to the request input from the host.

5. The storage device of claim 1, wherein the request input from the host includes at least one of a read request and a program request.

6. The storage device of claim 1, wherein each of the plurality of memory areas is one of a page, a memory block, and a plane.

7. The storage device of claim 1, wherein the memory controller is further configured to perform an exclusive OR operation using data to be stored in the first memory areas and the second memory areas and generate a parity for the data to be stored in the first memory areas and the second memory areas according to the exclusive OR operation.

8. The storage device of claim 1,
wherein the memory device includes a plurality of zones respectively corresponding to groups of consecutive logical addresses provided from the host, and
wherein the memory controller is further configured to generate a parity for data to be stored in each of the plurality of zones using the data to be stored in each of the plurality of zones.

9. The storage device of claim 1, wherein when a size of the second parity information stored in the memory controller is equal to or greater than a threshold value, the memory controller is further configured to provide the memory device with a parity generated using data having a preset size among the parities stored in the memory controller.

10. The storage device of claim 9, wherein when the parity generated using the data having the preset size does not exist in the memory controller, the memory controller is further configured to provide the buffer memory with a parity for data stored in a least recently accessed memory area among the parities stored in the memory controller.

11. A memory controller that controls a buffer memory and a memory device including a plurality of memory areas, the memory controller comprising:
a parity information controller configured to:
provide first parity information including a parity for data stored in each of one or more first memory areas among the plurality of memory areas to the buffer memory, and
store second parity information including a parity for data stored in each of one or more second memory areas except for the one or more first memory areas among the plurality of memory areas; and
a sudden power off controller configured to control the memory device to store dump parity information including the second parity information when a sudden power off occurs and provide the dump parity information to the parity information controller when power is turned on after the sudden power off occurs,
wherein the parity information controller regenerates, when a parity for data corresponding to a request input from a host does not exist in the dump parity information stored in the parity information controller after the power is turned on, the parity for the data corresponding to the request input from the host.

12. The memory controller of claim 11, wherein the dump parity information further includes the first parity information.

13. The memory controller of claim 11, wherein the parity information controller comprises:
a parity information generator configured to generate the first parity information and the second parity information by generating a parity for data to be stored in the first memory areas and the second memory areas; and
a parity information storage configured to store the second parity information.

14. The memory controller of claim 13,
wherein the memory device is configured to store third parity information including a parity for data stored in each of one or more third memory areas except for the one or more first memory areas and the one or more second memory areas among the plurality of memory areas, and
wherein when the parity for the data corresponding to the request input from the host does not exist in the third parity information, the parity information generator regenerates the parity for the data corresponding to the request input from the host.

15. A method of operating a storage device, the method comprising:
storing parity information including a parity for data, which is stored in a plurality of memory areas, in a buffer memory and a memory controller;
sensing a sudden power off;
storing the parity information in a memory device in response to the sudden power off;
providing the parity information stored in the memory device to the memory controller in response to power-on after the sudden power off; and
regenerating a parity for data corresponding to a request input from a host in response to the parity for the data corresponding to the request input from the host does not exist in the parity information provided to the memory controller.

* * * * *